Jan. 5, 1971 E. B. DANE, JR 3,552,065
BEARING RACE GROOVE GRINDER
Filed April 29, 1969 6 Sheets-Sheet 1

INVENTOR.
ERNEST B. DANE JR
BY
ATTORNEYS

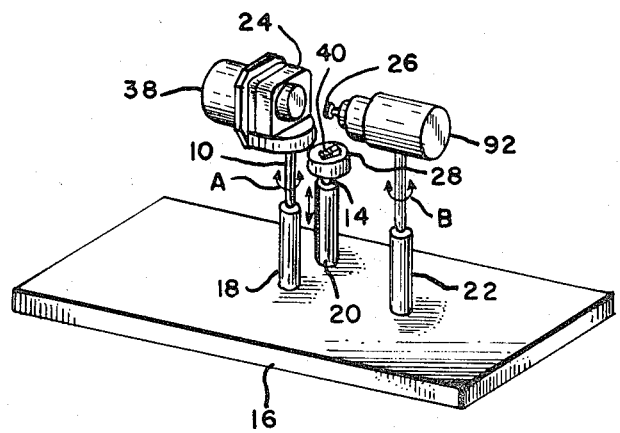
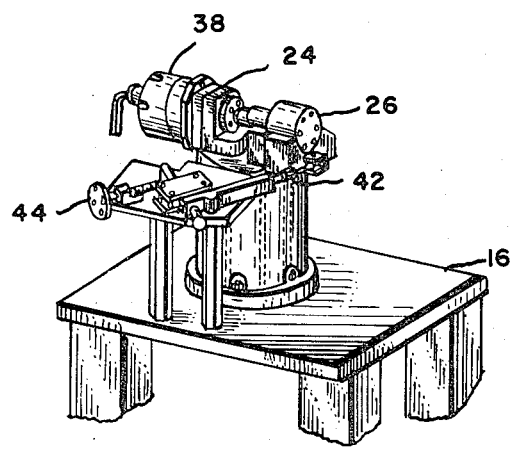
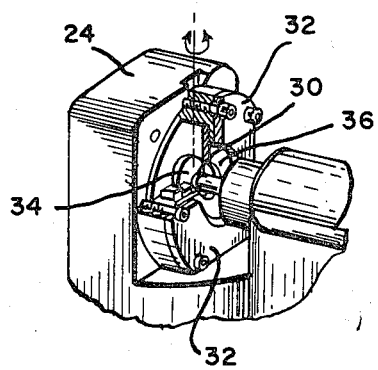

Jan. 5, 1971  E. B. DANE, JR  3,552,065

BEARING RACE GROOVE GRINDER

Filed April 29, 1969  6 Sheets-Sheet 3

INVENTOR.
ERNEST B. DANE JR.
BY
ATTORNEYS

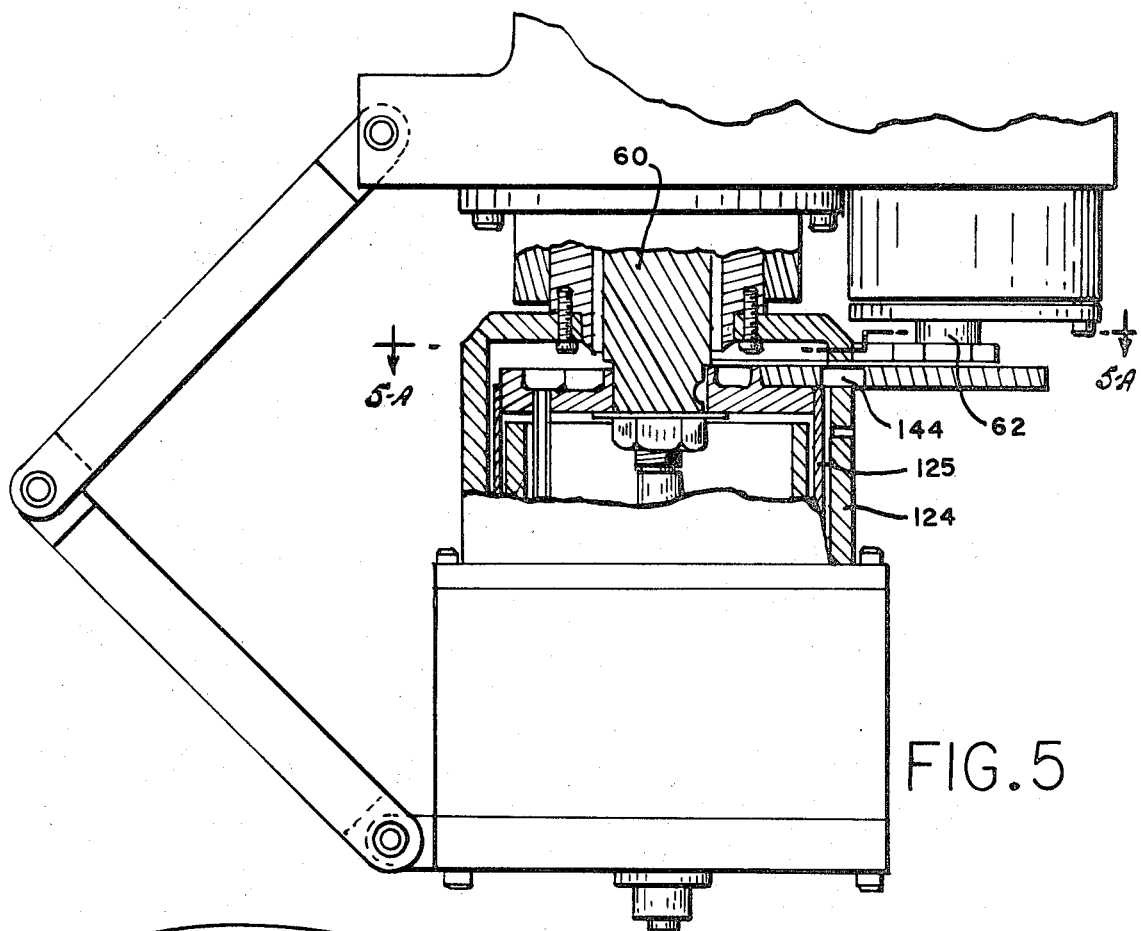
FIG. 5
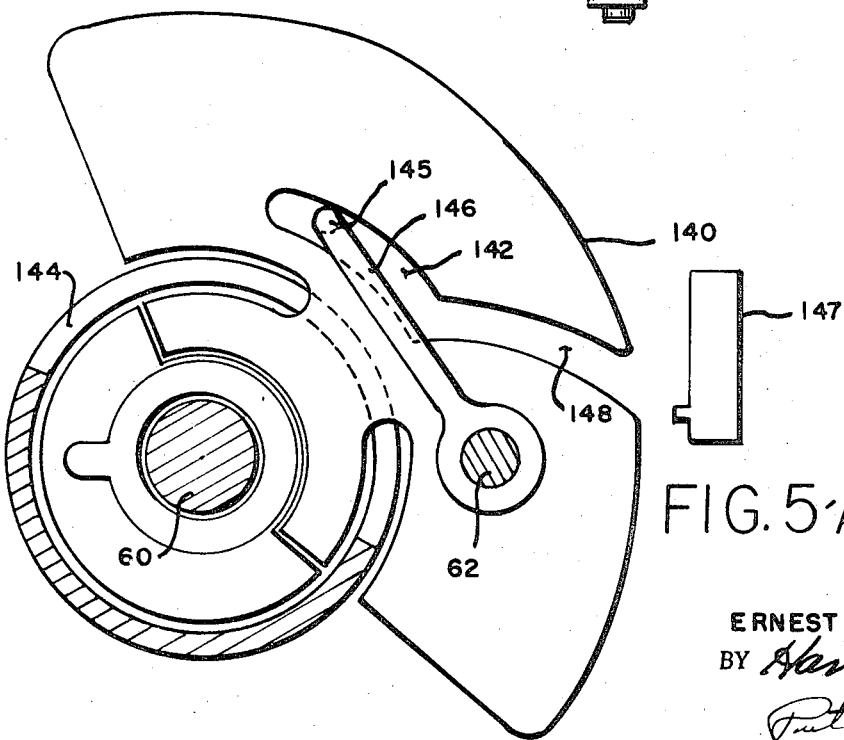
FIG. 5-A

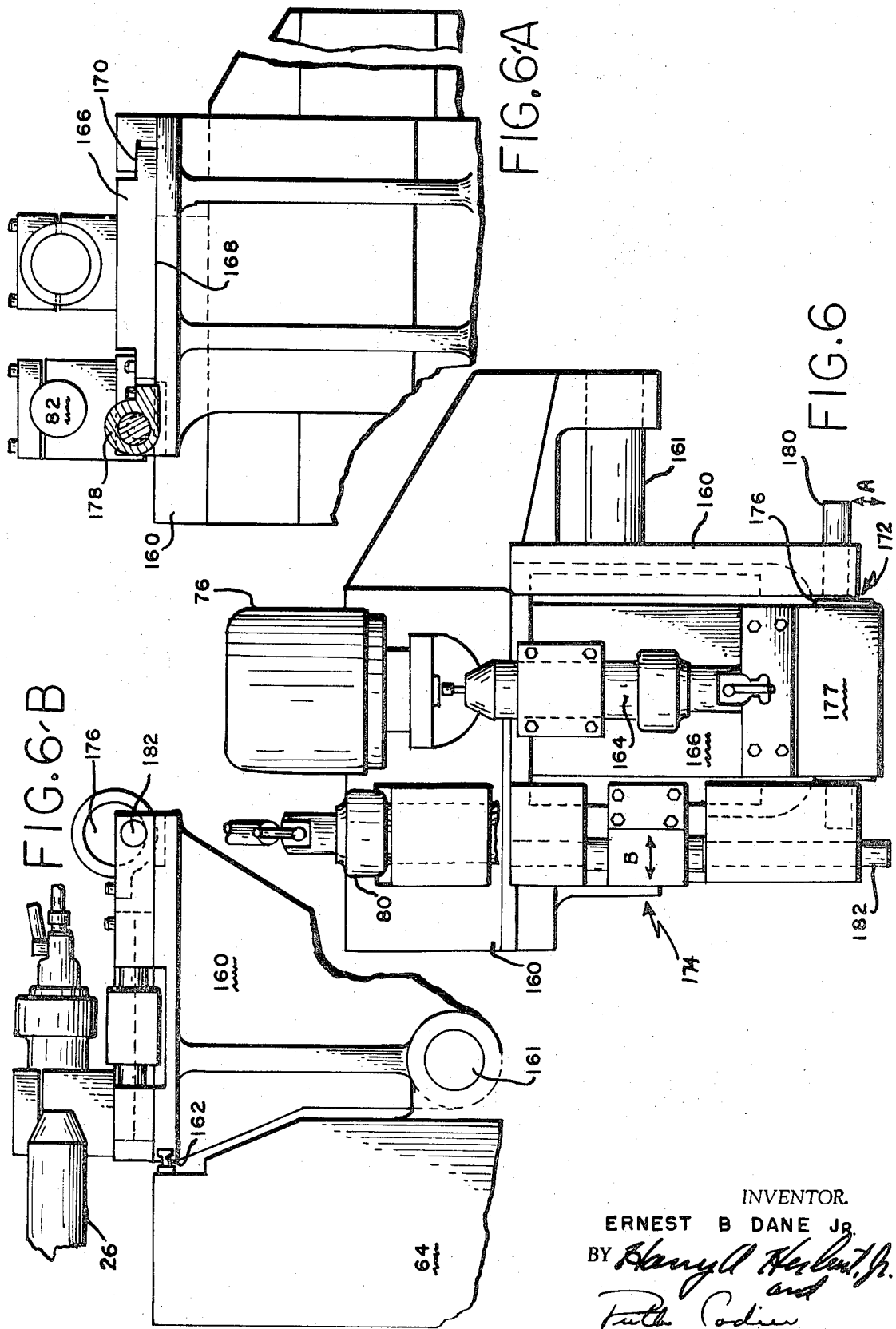

United States Patent Office 3,552,065
Patented Jan. 5, 1971

3,552,065
BEARING RACE GROOVE GRINDER
Ernest B. Dane, Jr., Belmont, Mass., assignor to the United States of America as represented by the Secretary of the Air Force
Filed Apr. 29, 1969, Ser. No. 820,176
Int. Cl. B24b 7/00
U.S. Cl. 51—5
9 Claims

ABSTRACT OF THE DISCLOSURE

The invention includes an original embodiment and an improved modification of the original device. In the first modification three vertical shafts are carried on a base and each is provided with pressurized hydraulic bearings which control the motions of the three shafts carrying respectively the workhead, the grinding head and the dressing tool. For dressing, the grinding tool swings about its vertical axis for contact with the dressing tool. In the improved device the third shaft carrying the dressing tool is eliminated and the dressing tool is placed on the workhead in a vertical line above the center of the workpiece, so that the dressing tool and workpiece are moved into and out of operative position with respect to the grinding tool by raising and lowering the work shaft. Both the work shaft and the grinding shaft are mounted to provide oscillation about vertical axes. The radius of oscillation corresponds to the radius of curvature sought in the race groove being ground.

A fail safe device prevents vertical movement of the work shaft as long as the grinding tool is still in the race.

BACKGROUND OF THE INVENTION

The invention relates to race groove grinders and more particularly to a form grinder which, by its inherent accuracy and high degree of controlled performance, produces a race needing no further polishing.

Problems arise in the bearing grinders in use today because, although a fair geometrical surface can be produced with the equipment available, the necessary finishing operations may degrade the geometry or fail to produce a satisfactory finish.

The ball bearings used in navigational gyros require accuracy in excess of those for more ordinary uses. While fair precision of race groove contour is attained by present grinding machines, difficulty is experienced, as above noted, in polishing the groove and maintaining the shape of the groove in the finished race.

Further, complex machines now in use require complex arrangements and rearrangements for carrying out grinding and polishing operations, and sometimes, as noted above, while the exacting geometry may be obtained in the grinding operation, there is a possibility that this high degree of precision cannot be maintained during the polishing operation.

SUMMARY OF THE INVENTION

The primary object of the invention is to produce a race of such smooth surface and such high degree of geometric accuracy in one grinding operation that further polishing is rendered unnecessary. The smooth surface is effected by the provision of means for oscillating the workpiece, thereby adding cross motion to the usual rotary motions in the grinding operation. The high degree of geometric accuracy is effected by the provision of a rotary feed which allows micro inch depth control. This is made possible by virtue of a low speed, low friction pressurized bearings.

A further object of the invention is the replacing of complex machinery for grinding and polishing race grooves by a device which accomplishes grinding and polishing in one setting.

It is to be noted that two embodiments of the invention have been worked out by the inventors, the second embodiment containing elements which are improvements over the first. The first embodiment requires that three parallel shafts be mounted vertically on a table or other mounting surface. The three shafts carry (1) the workpiece, (2) the grinding wheel, and (3) the dressing diamond.

The second embodiment eliminates the third axis and places the dressing diamond, as noted above, on the work spindle mount. In the first embodiment, the conditions necessary to obtain a sufficient degree of accuracy were very difficult to obtain. An isosceles triangular arrangement of the three essential elements, with an accuracy of 2–5 microinches, is necessary and these conditions are met only with the greatest difficulty.

In the new arrangement of the second embodiment the dressing implement has been moved from its position on the third axis, which is now eliminated, to a point on the work axis just above the race being ground. By virtue of this arrangement, the edge of the grinding wheel may be dressed to a circular curve that is precisely centered on the axis about which the race is oscillated. This condition, as explained above is extremely difficult to obtain especially when three axes are used. On the other hand, it is comparatively easy to lap straight round shafts that can be raised or lowered thru the pressurized bearing to place one or the other of these implements in operative position.

A further object of the improved invention is the provision of a fail safe system to prevent accidental lowering of the wheel while it is still in the race. In the normal operation of the grinder, a cam plate, fixed and centered on the grinding head shaft at its base, engages an element on the workhead shaft, preventing its vertical movement. The work shaft must be turned counterclockwise to allow the grinding wheel to be swung out of the race. This motion also swings the cam out of its keying position to allow vertical movement of the work shaft.

A further object of the improved invention is the provision of a torque motor restrained by a liquid damper which has been substituted for the geared motor and crank system for oscillating the work axis. The torque motor operates more smoothly, and reverses more quickly, cutting down the dwell time at the end of the stroke.

A still further object of the invention is the provision of a cylindrical grinding attachment which may be added or omitted. It comprises a casting that can be swung into position, clamped to the back of the grinder and used for an operating cycle to grind the outside surface of the race, and be swung back out of the way when it is finished. It is capable of linear motions in all directions in a single plane and has many uses, one of which is the grinding of the outer bearing surface of the race being completed. It can also be used for dressing the face plate which holds the workpiece, and for grinding the dam of H-type outer races.

It in no way alters the basic action of the main grinder, but extends the machine's capability.

It can also grind the face of the cement chuck precisely perpendicular to its axis, and on its own bearings, as well as grinding flat flange shoulders and conical dams, all accurately concentric with the groove.

This entire unit is designed to be swung upward clamped into working position or lowered and swung out of the way during groove grinding. It may be included as an attachment to the device or may be omitted, as needs require.

DESCRIPTION OF THE DRAWINGS

FIG. 2 is a schematic representation of the original embodiment of the device with hydraulic equipment and enclosing structures omitted;

FIG. 2A is a perspective view of the device showing the enclosing casting structures and the mechanical micrometer grinding feed;

FIG. 2B is a perspective view of the workhead of the original embodiment showing the workhead and the grinding wheel in operative position;

FIG. 5 is a front elevational view partly in cross section showing the damper and fail safe and antitorque device;

FIG. 5A is a fragmentary view partly in cross section and taken on the line A—A of FIG. 5;

FIG. 6 is a top plan view of the grinder attachment which provides an additional grinding tool centered on the same axis and the main grinding tool and used for grinding the outer bearing surface of the race;

FIG. 6A is a rear elevational view looking in the direction of the arrow A in FIG. 6; and FIG. 6B is a side elevational view of the device shown in FIG. 6.

DESCRIPTION OF THE ORIGINAL EMBODIMENT

Figure 1:
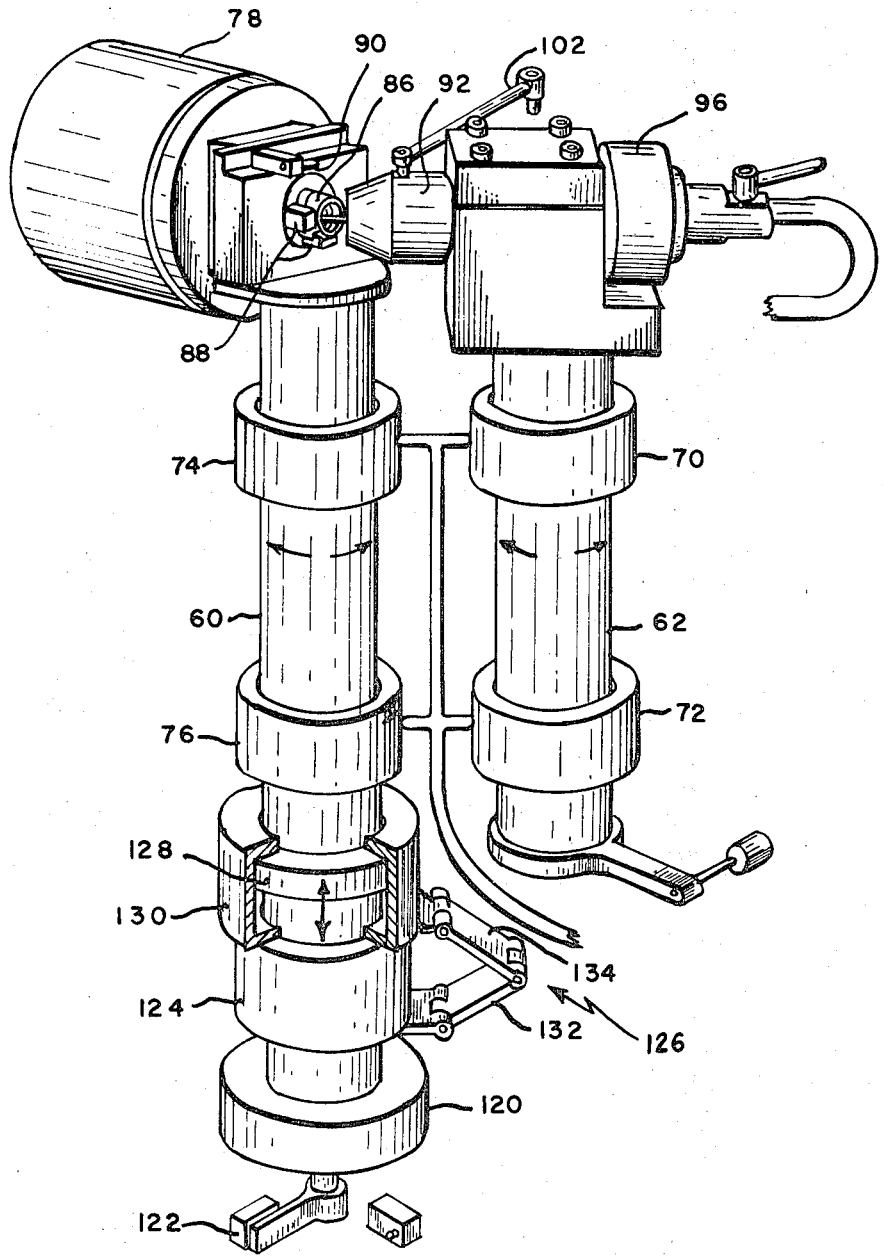
FIG. 1 is a schematic view of the improved and modified form of the invention.

Referring to FIGS. 2, 2A and 2B, three shafts 10, 12 and 14 are mounted in parallel relationship to each other and perpendicular to a support 16. The shafts or axes 10, 12 and 14 are mounted for rotative movement in sleeves 18, 20 and 22 respectively, which arise rigidly from the support or platform 16. In addition the shaft 14 is mounted for vertical movement within the sleeve 20.

Referring more in detail to FIGS. 2, 2A and 2B: Each of the three vertical shafts 10, 12 and 14 pivots with respect to the base 16 by virtue of its respective mounting in the pressurized bearing members 18, 20 and 22. The shaft 14 is mounted additionally for vertical movement as indicated by the arrow c. The pivoting movements of 10 and 12 are indicated by the arrows A and B.

The workhead 24 is mounted on and moves with the shaft 10. It positions, rotates and oscillates the workpiece or race 30. The race 30 which is being ground is radially positioned by two line-contact shoes 32, which are mounted 90° apart. A suitable material for the shoes 32 is tungsten carbide.

The radial portion of the work spindle follows standard plunge grinder practice and is not shown in detail in FIGS. 2, 2A and 2B. FIG. 2B shows a workhead cross section. A face plate 34 which is supported on radial and axial hydrodynamic bearings, fixes the axial position of the workpiece 30 and supplies power for the rotary movement of the race being worked on. Clamping of the race 30 to the face plate 34 is accomplished by a hydrostatic, circular, pressure plate 36 that is piloted on the outside diameter of the race.

Final alignment of the race 30 is made by adjusting the radial support shoes 32 and an eccentric bushing installed between the workhead 24 and the vertical shaft 10 upon which it is mounted. This is not shown in detail since it is a well known method and means for gaining oscillating movement.

The power for driving the race during grinding is obtained from the induction motor 38. This may be a squirrel-cage induction motor with a high-resistance stator, and capable of motor speed variation from 200 to 1800 r.p.m.

During operation, the race being ground is oscillated through an angle of the order of 30° about the center of cross curvature of the race way groove and at a speed of oscillation that can be varied from 1 to 60 cycles/min.

An accelerometer (not shown) is attached to the workhead and its output may be fed to an amplifier and loudspeaker for providing an audible indication of the contact between race 30 and the grinding wheel 26. The grinding head 26 performs the grinding operation on the race or workpiece 30, that has been mounted in the workhead by the means described. It is mounted so that it will pivot on its vertical axis to engage either the race 30 being ground or the dressing head 28 later described.

The one-piece turbine rotor of the grinding head is supported radially by two three-pad step bearings (not shown) and axial by spiral-groove hydrodynamic thrust bearings. The rotor on which the grinding wheel is mounted is driven by pressurized fluid at pressures of the order of 200 p.s.i. and a rate of flow of the order of 20 gallons per minute.

For stability the three shafts 10, 12 and 14 are mounted in holes in a massive block of cast iron to give rigidity and accurate alignment to their pressurized hydraulic bearings.

The grinding head 26 turns through an angle of approximately 60° in moving from dress position to grind position. A micrometer feed mechanism 42, shown in FIG. 2A accomplishes this movement. Its accuracy must be of such high degree as to control the grinding head in the grind position to within a few millionths of an inch.

A micrometer wheel infeed 44 controls the amount of grind and dress, and also provides a very coarse adjustment when rotating the grinding head 26 from grind to dress position.

The grinding operation is monitored by two differential transformers (not shown). A new reference setting is made after each dress operation, so that all workpieces are ground to the same diameter, regardless of the size of the grinding wheel.

DESCRIPTION OF THE IMPROVED AND PREFERRED EMBODIMENT OF THE INVENTION

The second embodiment of the invention was designed to overcome the difficulties in adjusting the three tools, that is the dressing diamond, the workpiece and the grinding tool in accurate isosceles triangular relationship.

The inventor discovered that great advantage was to be achieved by eliminating the third shaft on which the dressing diamond was mounted and placing the diamond on the workhead directly above the workpiece. In this arrangement the third shaft is eliminated and greater accuracy is accomplished since the race being worked on and the dressing diamond are in the same radius of oscillation on the workhead shaft.

Figure 3:
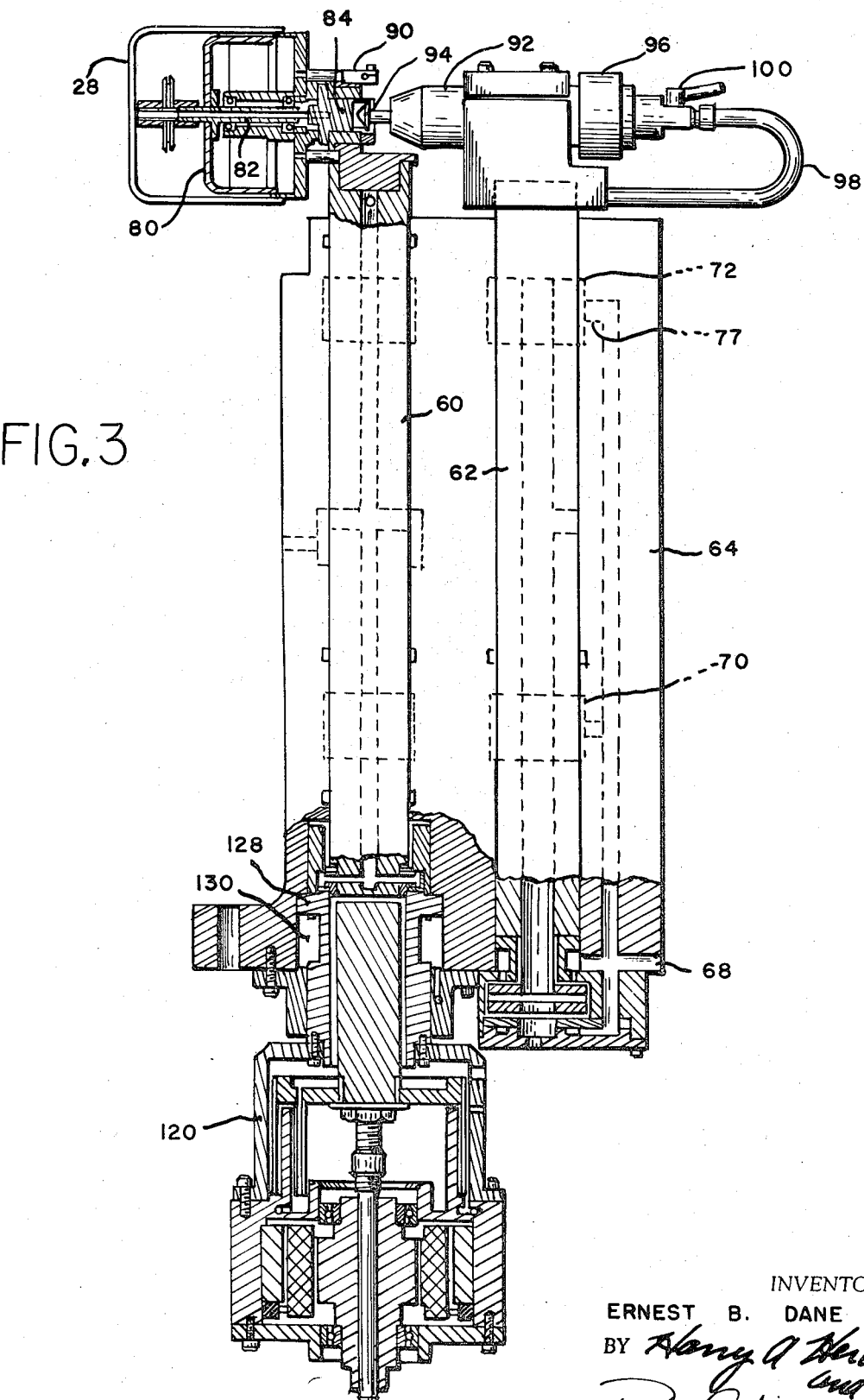
FIG. 3 is a schematic front elevation of the improved device shown partly in schematic elevation of enclosed cross section.
Figure 4:
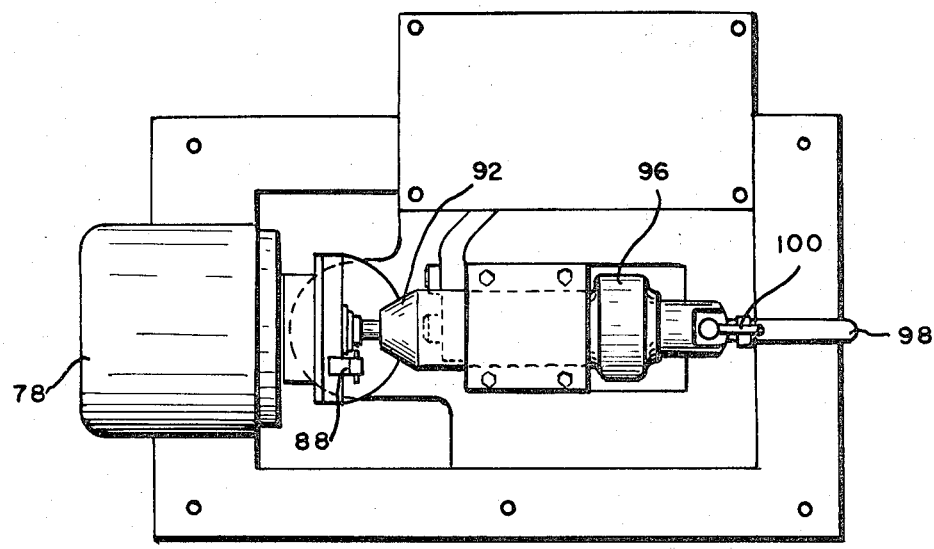
FIG. 4 is the top plan view of the device as shown in FIG. 3.

Referring to FIGS. 1 and 3 the two shafts 60 and 62 are mounted on a base (not shown). A suitable casting 64 encloses both shafts 60 and 62 and provides stability for the vertical shaft bearings for the high pressure oil duct system. This is shown schematically in FIG. 1 and in somewhat more detail in FIG. 3.

A high pressure oil inlet is shown at 68. The duct system carries oil under pressure to the hydrostatic bearings 70 and 72 on the grinding-head shaft 62, and to the precise hydrostatic bearings 74 and 76 located on the workhead shaft 60. The amount of pressure applied to each bearing will be determined by the size and character of the inlet to it. A schematic representation of such an inlet is shown at 77.

A workhead indicated generally by the numeral 78 is mounted on the shaft 60. It encloses a motor 80 which drives a work spindle 82, on which the workpiece or bearing race 86 is mounted.

The bearing race 86, is mounted on a horizontal axis, and is held in position by a pair of shoes 88 located on the workhead and in radial 6 and 9 o'clock position with reference to the axis of the workpiece. In this modification the dressing diamond 90 is located on the workhead 78 and directly above it so that it can be moved into operating relationship with respect to the grinding tool by simply lowering the shaft 60.

The head 92 which carries the grinding tool 94 is mounted on a horizontal axis on the shaft 62. The grinding tool is operated by a motor 96.

A very accurate feed mechanism is indicated generally by the numeral 102. This means may be mechanical as shown in FIG. 1 of the improved embodiment, or electrical as desired, and controls the position of the grinding tool 94 within the precision limits of the order of $2 \times 10^{-6}$ inches.

Shaft 60, carrying the work spindle, is oscillated by a torque motor 120, whose speed is limited by a damper 124. This gives constant speed thru the main part of the stroke with very short dwell times during reversal. This advantage would be lost if the damper case rotated slightly at the moment when the torque on it is reversed. The links 132 and 134 are designed to do this in spite of the vertical motion of the shaft.

A linkage indicated generally by the numeral 126 prevents the casing of the damper 124 from rotating even though the shaft 60 is moved to either up or down vertical positions.

The system comprises a piston 128 rigidly mounted on shaft 60 and providing both up and down stops for a member 130. One link 132 of the linkage system is pivoted to the damper 124 and moves upward and downward as the shaft 60 moves. The upper link 134 is pivoted to the bottom of the main casting.

Vertical motion of shaft 60 is effected by piston 128 working in cylinder 130. The upper and lower heads of the cylinder form the stops at the two positions. The actual position of both ends of the stroke can be adjusted by fitting lapped spacers on top of and underneath the piston 128.

The shaft 62 is mounted for rotary oscillating motion only. This allows very accurate control of the position of the wheel relative to the work 30, both axially due to the stiffness of the pressurized bearings, and in depth of cut, due to the low friction of those bearings. In addition, the rotary motion will swing the grinding tool out of its position within the race.

A cam 140 is mounted rigidly on shaft 60, thru damper inner member 125. A slot 144 in damper housing 124 allows the cam 140 to swing relative to the stationary damper housing 124.

A cam follower 145 on arm 146 which is rigidly fixed to grinder shaft 62, can swing a short distance within the slot 142, for grinding and dressing operation. It can swing further, to bring the grinding wheel out of the race, when the work shaft 10 has been rotated to the proper position. This is the position in which the wheel may swing completely clear. It also is the position where the radial slot 148 is opposite the cam follower 145. A switch 147 prevents vertical motion valves from operating unless it is opened by pressure from cam followers 145. When the switch is opened, oil can be released from below the piston to be pumped in above the section to lower the shaft 60.

Referring to the auxiliary grinding attachment shown in FIGS. 6, 6A and 6B:

An auxiliary casting 160 is pivoted to the main grinder casting 64 at 161 and may be swung into position for grinding. It is clamped to the back of the grinder by suitable means after it has been swung into grinding position. A T-thread clamp bolt is shown at 162.

On the top of the casting 160, a second grinding spindle 164 is mounted on a flat plate 166, which forms the moving member between upper and lower pressurized thrust bearings 168, 170. These bearings confine motion of the plate 166, and therefore that of the spindle 164 to a single horizontal plane, but allow movement in any direction in that plane. Two feed mechanism assemblies indicated generally by the numerals 172 and 174, mounted at right angles to each other, combine the function of feeding along one axis, indicated by the arrow A in FIG. 6, and grinding motion along the right angular one (see arrow B) so that each complements the other.

This is accomplished by the eccentrics 176 and 178. The shafts 180 and 182 on which these eccentrics are mounted, form the fulcrum of a lever reduction system. The eccentricity radius forms the short arm, and the radius of a large worm gear (not shown), forms the long arm. Rotation of this system takes care of the feeding function. To perform the grinding function, the eccentrics 176 and 178 and the bearings 177 and 179 that fit around them, are given a long axial dimension which makes them stiff against skewing forces.

Microinch precision is secured by low friction and high radial stiffness in the bearings. Both the shaft bearings 168 and 170 attached to the moving plate, are of the extremely pressurized hydrostatic type.

Much larger motions are needed on the radial axis, when we change from internal to external grinding, but these settings do not need great accuracy. However, it is necessary to clamp the system firmly after a move has been made, so as to form a firm base for the fine feeds used in actual grinding and wheel dressing.

In the axial direction, means must be provided for backing off several inches, to clear the workhead oscillation while groove grinding. These larger motions are mechanized by mounting the whole auxiliary casting on a horizontal, pressurized bearing shaft running along the back of the main casting. The casting 160 will slide along this shaft for the radial settings, and will rotate around it to get out of the way when not in use.

Clamping will be accomplished by a T-head bolt 162 extending backward from the main casting, which works in a T-slot (not shown) in the front of the auxiliary casting. The T-head will be turned horizontal to enter the slot, then turned in a vertical position to support the casting while moving. Finally, it will be drawn forward to clamp the casting against a pad surrounding the bolt hole. This design may be reversed.

During the use of the attachment, the work spindle and the main grinding spindle axes must be rotated to a position at right anglse to their usual one. The work spindle must be accurately adjusted to avoid inaccurate grinding.

Although the invention has been described with reference to a partciular embodiment, it will be understood to those skilled in the art that the invention is capable of a variety of alternative embodiments within the spirit and scope of the appended claims.

I claim:

1. In a bearing race groove grinder a workhead capable of carrying a race to be ground, a vertically mounted grinding shaft, a main grinding head, a main grinding tool mounted thereon, a vertically mounted work shaft, a dressing tool and a base, said workhead having a horizontal axis and being mounted on said work shaft, said work shaft rising vertically from said base and being capable of rotary and oscillating movement with respect to said base, said grinding head having a horizontal axis and mounted on a grinding shaft rising vertically from said base and capable of rotary movement with respect thereto, said dressing tool being mounted on a shaft rising vertically from said base and capable of vertical movement with respect to said base for moving said dressing tool into operative position for dressing said grinding tool, and out of operative position with respect to said grinding tool so that in one position said grinding tool may contact said race for grinding said race and in the alternative position contact said dressing tool to be dressed by said dressing tool.

2. A device according to claim 1 wherein said work head, said grinding head and said dressing tool are each mounted on a seperate shaft arising vertically from said base.

3. A device according to claim 1 wherein said dressing tool is mounted on said work head and in vertical relation with respect to said work piece, so that said dressing tool and said race may be placed alternately into operating position with respect to said grinding tool by alternately raising and lowering said work shaft.

4. In a device according to claim 3, means for oscillating said work shaft about a predetermined center of oscillation so that said grinding tool is dressed around the same center about which the work oscillates during actual groove grinding.

5. A device according to claim 4 wherein said means comprises a torque motor, a damper and a set of pressurized bearings.

6. In a device according to claim 3, means for moving said grinding tool into and out of position for grinding said race.

7. In a device according to claim 3 a fail safe device for halting any vertical movement of said work head shaft when said grinding tool is in grinding position with respect to said work piece, said fail safe device comprising a cam plate element rigidly secured to the grinding shaft to move with the rotary movement of said grinding shaft, and to engage said work shaft to prevent vertical movement thereof when said grinding shaft is in a position of operation of the grinding tool mounted thereon, and to disengage from said work shaft to allow vertical movement of said work shaft upon counterclockwise movement of said grinding shaft.

8. A device according to claim 7 wherein said fail safe device comprises, also a collar on said workhead shaft and movable therewith, a channel member mounted on said work shaft capable of limited movement with respect to said workhead and providing stops for contacting said collar for limiting the upward and downward movement of said workhead shaft.

9. A grinder attachment for the device as set forth in claim 8 said attachment comprising a plate, an auxiliary grinding spindle mounted on said plate for grinding a race mounted on said work shaft, and swung 90° from its work position with reference to said main grinding spindle a set of bearings for said plate for allowing movement of said plate in any direction in the plane of said plate, a casting for mounting said plate and bearings, said casting being pivoted to the rear portion of said main grinder casting, and adapted to be swung into position to grind a race mounted on said work spindle, and to be swung out of operative position, and out of the way of said main grinder.

References Cited
UNITED STATES PATENTS

| | | | |
|---|---|---|---|
| 1,563,355 | 12/1925 | Fox | 51—97 |
| 2,248,172 | 7/1941 | Hollengreen et al. | 51—291 |

WILLIAM R. ARMSTRONG, Primary Examiner

U.S. Cl. X.R.

51—97, 291